US006276881B1

(12) United States Patent
Scott (10) Patent No.: US 6,276,881 B1
(45) Date of Patent: Aug. 21, 2001

(54) METHOD OF MANUFACTURING SLOTTED COMPONENT

(75) Inventor: David William Scott, Ruse (AU)

(73) Assignee: Bishop Steering Pty Limited, New South Wales (AU)

( * ) Notice: Subject to any disclaimer, the term of this patent is extended or adjusted under 35 U.S.C. 154(b) by 0 days.

(21) Appl. No.: 09/101,181

(22) PCT Filed: Sep. 23, 1997

(86) PCT No.: PCT/AU97/00629

§ 371 Date: Aug. 26, 1998

§ 102(e) Date: Aug. 26, 1998

(87) PCT Pub. No.: WO98/13164

PCT Pub. Date: Feb. 4, 1998

(30) Foreign Application Priority Data

Sep. 24, 1996 (AU) .................................................. PO 2517

(51) Int. Cl.[7] ........................................................ B23D 5/00
(52) U.S. Cl. .................... 409/293; 409/299; 409/258; 409/244; 29/81.021; 408/229
(58) Field of Search ..................................... 409/293, 304, 409/305, 307, 346, 299, 258, 244; 29/156.7 R, 157.1 R, 557, 558, 81.02, 81.021; 51/241 S, 245; 408/154, 157, 147, 227, 229, 230

(56) References Cited

U.S. PATENT DOCUMENTS

| | | | |
|---|---|---|---|
| 644,595 | * 3/1900 | Grabler | 408/199 |
| 1,475,311 | * 11/1923 | Miller | 408/229 |
| 1,941,790 | * 1/1934 | Davis | 408/227 |
| 2,640,379 | * 6/1953 | Graves | 409/229 |
| 3,341,918 | * 9/1967 | Mansfield et al. | 409/244 |
| 3,495,483 | * 2/1970 | Janik | 408/211 |
| 4,140,432 | * 2/1979 | Heule | 408/154 |
| 4,246,728 | * 1/1981 | Leasher | 51/241 S |
| 4,535,519 | * 8/1985 | Kajikawak et al. | 29/557 |
| 4,554,817 | * 11/1985 | Dier | 29/157.1 R |
| 4,614,014 | * 9/1986 | Ferguson | 29/157.1 R |
| 4,689,864 | * 9/1987 | Fukuma et al. | 29/157.1 R |
| 4,768,268 | * 9/1988 | Ishihara et al. | 29/157.1 R |
| 5,390,408 | * 2/1995 | Bishop et al. | 29/558 |
| 5,597,273 | * 1/1997 | Hirsch | 408/227 |
| 5,720,585 | * 2/1998 | Musso | 409/293 |
| 6,032,350 | * 3/2000 | Roeske | 409/244 |

FOREIGN PATENT DOCUMENTS 6-191420 * 12/1994 (JP) .

* cited by examiner

Primary Examiner—A. L. Wellington
Assistant Examiner—Eric E Cadugan
(74) Attorney, Agent, or Firm—Arent Fox Kintner Plotkin & Kahn (57) ABSTRACT

Apparatuses and methods are implemented for machining a longitudinally extending slot in a bore of a component. The component is gripped in a gripping device of a workholding device. A cutting operation is performed in order to cut the slot in the bore by a cutting tool. The cutting operation forms burred slot edges. The edges are further machined by inserting a deburring device into the bore. Relative angular reciprocation for a limited angle is imparted between the deburring device and the component.

17 Claims, 8 Drawing Sheets

METHOD OF MANUFACTURING SLOTTED COMPONENT

TECHNICAL FIELD

This invention relates to a method for manufacturing a plurality of longitudinally extending slots in the bore of a component. One example of such a component is the sleeve element of an automotive power steering rotary valve. More particularly the invention is directed towards a method of minimising burring of the slot edges of the. sleeve component.

BACKGROUND ART

The prior art most closely related to that of the present invention is that covered by U.S. Pat. No. 5,328,309 (Bishop et al), U.S. Pat. No. 5,292,214 (Bishop et al). These prior art references relate to "slotting machines" which machine the slots in the bore of power steering valve sleeves. The design of these machines calls for each of the slots to be scooped out of the bore of a turned blank by a finger-like cutting tool mounted on a cutting spindle which angularly reciprocates about an axis in a series of progressively deeper cutting and return strokes so forming slots in the form of (usually) closed chambers, which are arcuate or partially arcuate in longitudinal section. The sleeve is held in a work holding collet, in turn mounted in a work holding spindle, having a rotational axis perpendicular to and offset with respect to the cutting spindle axis. By accurately indexing the work holding spindle upon completion of each slot, the required number of slots are precisely machined in the sleeve, usually 4, 6, 8, 10 or 12 slots for most automotive applications.

A problem associated with slotting is a tendency for bore material to burr at the edges of each slot being machined. Once an array of slots have been machined in the bore of a sleeve, a bore finishing operation can be performed by use of a boring tool. Such a method is disclosed in U.S. Pat. No. 5,390,408 (Bishop et at). However in this operation, the boring tool has been found to push the burrs on the slot edges in the direction of rotation, resulting in burr material overhanging each slot from one of its edges. On a typical slot width of say 4.5 mm, the burr overhang size may for instance be in the order of 30–70 $\mu$m.

A problem with slot edge burrs is that they affect the "boost control" and increase the noise generated during operation of the power steering valve. It has been found that the aforesaid limitations on slot machining of sleeves have imposed limitations on design of steering gear valves, and an object of the invention is to alleviate the situation by minimising the resultant burr on the sleeve edges.

SUMMARY OF INVENTION

In a first broad aspect the present invention is a method for machining at least one longitudinal extending slot in a bore of a component, comprising the steps of gripping said component in a gripping means of a workholding device, performing a cutting operation in which said slot is cut in said bore by a cutting tool, characterised by further machining the edges of said slot by inserting a deburring means into said bore and imparting relative angular reciprocation between said deburring means and said component.

In a second broad aspect the present invention is a method for machining an angularly disposed array of parallel longitudinally extending slots in a bore of a component, comprising the steps of gripping said component in a gripping means of a workholding device mounted on an indexable workholding spindle, performing a cutting operation in which said array of slots are cut in said bore by a cuting tool, characterised by further machining the edges of each slot by inserting a deburring means into said bore of the component and imparting relative angular reciprocation between said deburring means and said component whilst said component remains gripped in said gripping means.

In a third broad aspect the present invention is an apparatus for machining an angularly disposed array of parallel longitudinally extending slots in a bore of a component, said apparatus comprising gripping means for gripping said component in a workholding device mounted to an indexable workholding spindle, slotting means for cutting an array of slots within the bore, characterised in that said apparatus further comprising a deburring means for machining the edges of each slot by inserting said deburring means into said bore and imparting a relative angular reciprocation between said deburring means and said component whilst said component remains gripped in said gripping means.

Preferably the deburring means is a mandrel which is rotationally guided by the boric of the component during said relative angular reciprocation, the mandrel incorporating at least two cutting edges, a first cutting edge arranged lo deburr a first edge of at least one slot for clockwise angular rotation of the mandrel, and a second juxtaposed cutting edge to deburr a second edge of said at least one slot for anticlockwise angular rotation of the mandrel.

Preferably said component is a sleeve and said slot is a sleeve slot.

Preferably the mandrel is substantially cylindrical and comprises on its outside surface at least one land lying circumferentially between two flutes, said first and second cutting edges disposed along the lines of intersection of the land and the two flutes, the land arranged to circumferentially underlap the sleeve slot immediately prior to said angular reciprocation.

In a first preferred embodiment the first and second cutting edges of said land are substantially parallel, and arranged also parallel to the axis of the substantially cylindrical mandrel.

In a second preferred embodiment the first and second cutting edges of said land are substantially parallel, and arranged skew to the axis of the substantially cylindrical mandrel, hence forming a substantially helical land.

In a third preferred embodiment the first and second cutting edges of said land arts non-parallel, hence forming a tapered land.

BRIEF DESCRIPTION OF THE DRAWINGS

The present invention will now be described by way of example with reference to the accompanying drawings in which.

MODE OF CARRYING OUT INVENTION

Figure 1:
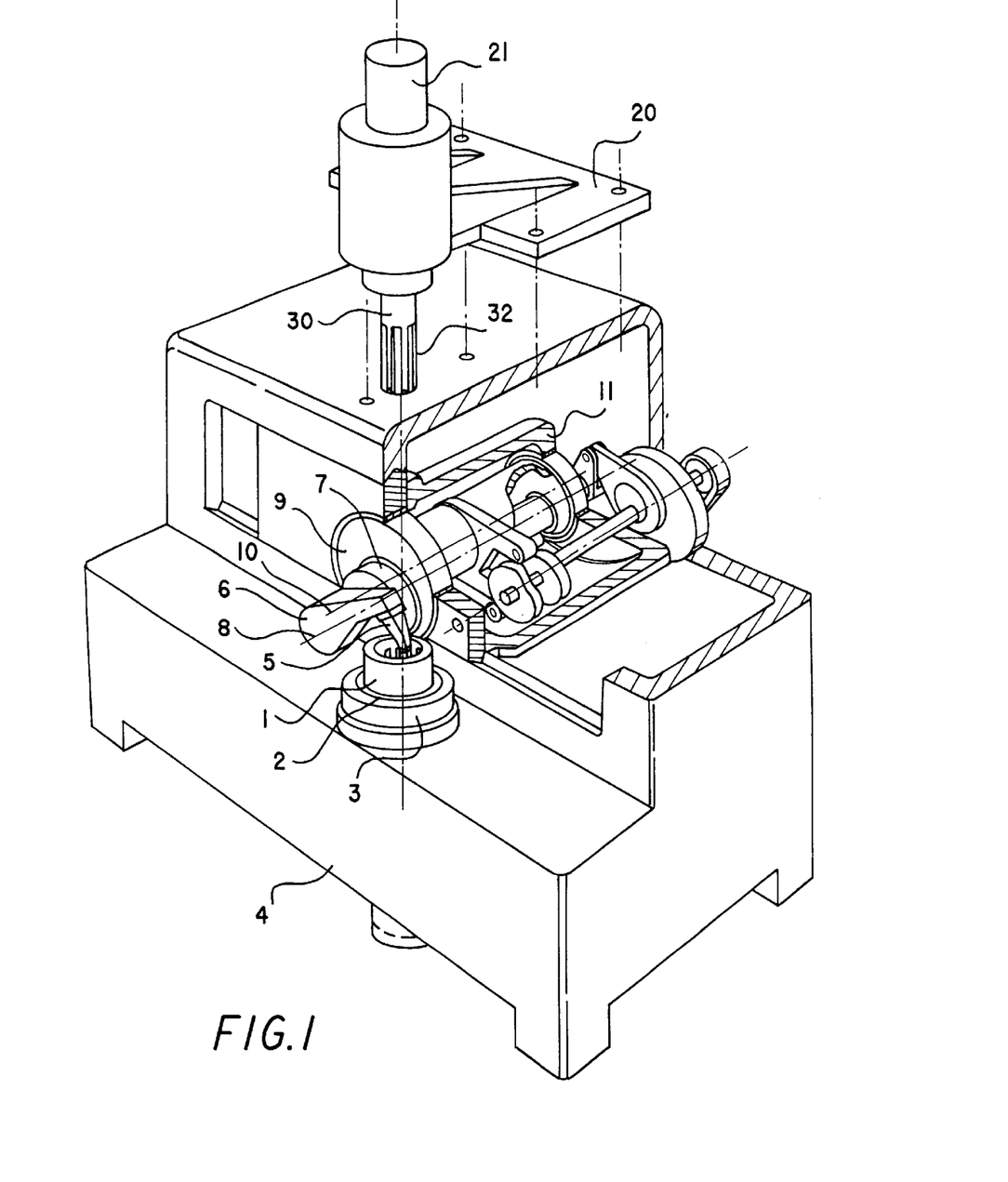
FIG. 1 is a sectioned perspective schematic view of a slotting machine in accordance with a first embodiment of the present invention.

FIG. 1 shows a slotting machine which holds sleeve 1 in collet 2 of work holding spindle 3 which is mounted for both rotation and axial sliding in machine base 4. Cutting tool 5 is secured to an arm 6 extending from cutting spindle 7. Cutting spindle 7 oscillates angularly through an angle of approximately 45 degrees and cutting tool 5 is shown in its uppermost position. Cutting spindle 7 is journalled for rotation about an axis 8 within spindle carrier 9 which is itself journalled about an axis 10 in cutting capsule 11. The typical angular oscillation of spindle carrier 9 is approximately 8 degrees.

The cam drive arrangement for imparting reciprocating motion to cutting tool 5 which is housed within cutting capsule 11, is not described herein as it is fully covered in U.S. Pat. No. 5,292,214 (Bishop et al). The indeed mechanism may be of a mechanical cam driven type as described in the above referenced prior art or of a suitable numerically controlled servo-drive mechanism, adapted to impart relative linear horizontal motion between the cutting capsule 11 and the sleeve, thereby providing a means for infeeding cutting tool 5 during a cutting operation.

The work holding spindle is also adapted for axial (vertical) linear movement which may in operation be similar to that described in the above referenced prior art U.S. Pat. No. 5,328,309 (Bishop et al), or alternatively by a suitable numerically controlled servo-drive means. This allows for the sleeve to axially clear the cutting tool. However, in another not shown embodiment the relative vertical linear movement between the work holding spindle and the cutting tool may be achieved by providing a vertically movable cutting capsule.

Figure 2:
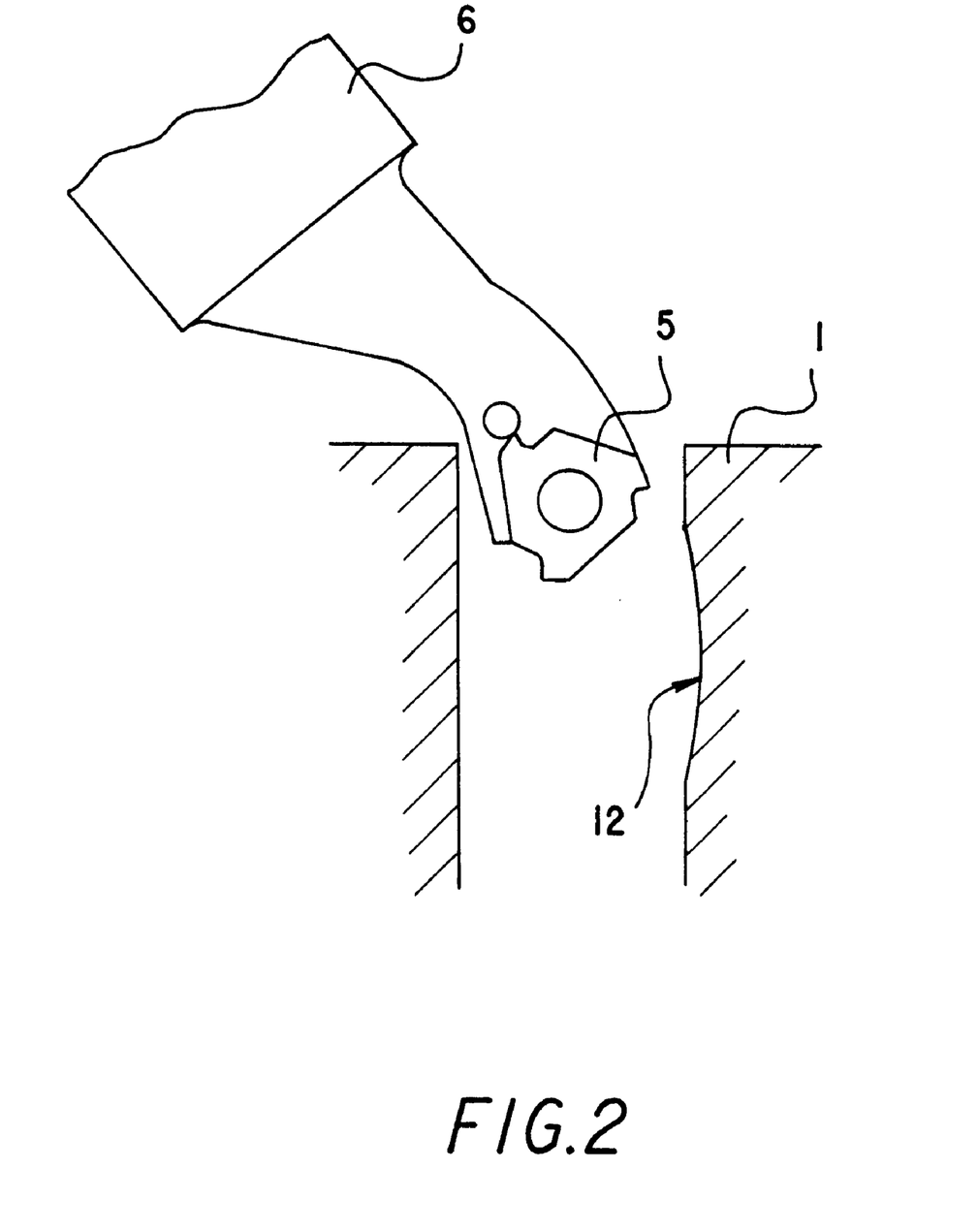
FIG. 2 is a partial vertical cross section of a sleeve with a blind-ended slot in relation to the cutting tool of the machine shown in FIG. 1.

FIG. 2 shows sleeve 1 in its relation to cutting tool 5 when cutting a blind-ended arcuate slot 12. For ease of description this embodiment will describe slotting an array of slots where each slot is similar to slot 12. However, it should be understood that the method of the present invention, could be utilised with slots of varied configuration such as those disclosed in Australian Provisional Patent Application No.PN6288 filed Oct. 31, 1995, entitled "Component and method of manufacture thereof" and Australian Provisional Patent Application No.PO0647 filed Jun. 26, 1996, entitled "Slotted component and method of manufacture thereof".

In a cutting operation an array of blind ended slots 12 are cut into the bore of sleeve 1, with cutting tool 5 scooping out each slot in a series of progressively deeper cutting and strokes. The work holding spindle 3, and therefore gripped sleeve 1, are accurately indexed upon completion of each slot.

The slotting machine shown in FIG. 1 incorporates a deburring assembly 20, which includes a sliding tool support device 21 whose axis is machined precisely in line with the bearings supporting work holding spindle 3 in machine base 4. Sliding tool support device 21 incorporates rotatable bar 30 on which cylindrical mandrel 32 is mounted or is integral therewith. With cutting tool 5 moved out of the way, typically after all slots have been cut, it is possible to axially slide sliding tool device 21 such that mandrel 32 is inserted into the bore of sleeve 1.

Figure 3:
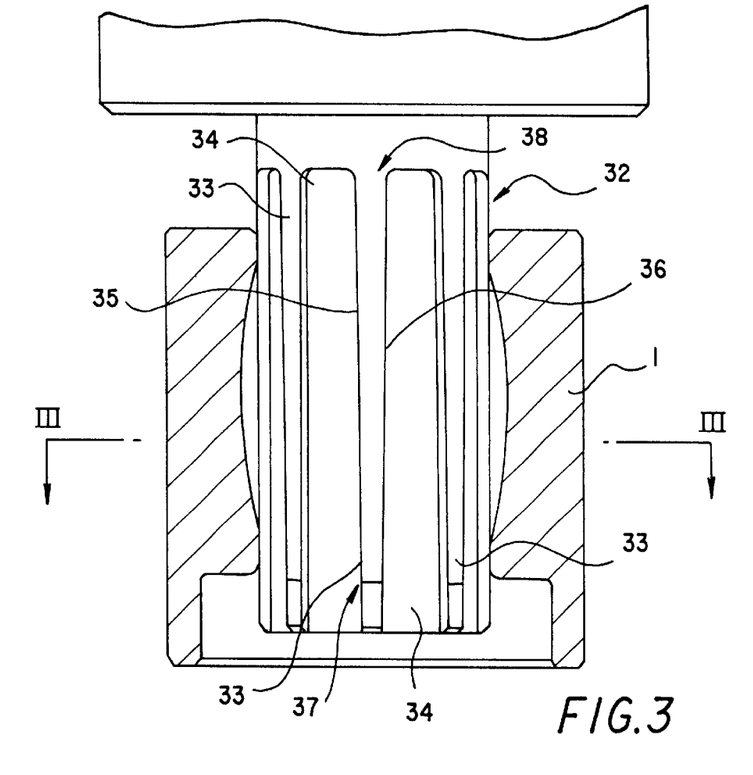
FIG. 3 is an enlarged elevation view of a first embodiment of a mandrel in accordance with a slotting machine of FIG. 1 inserted into a sleeve.
Figure 4:
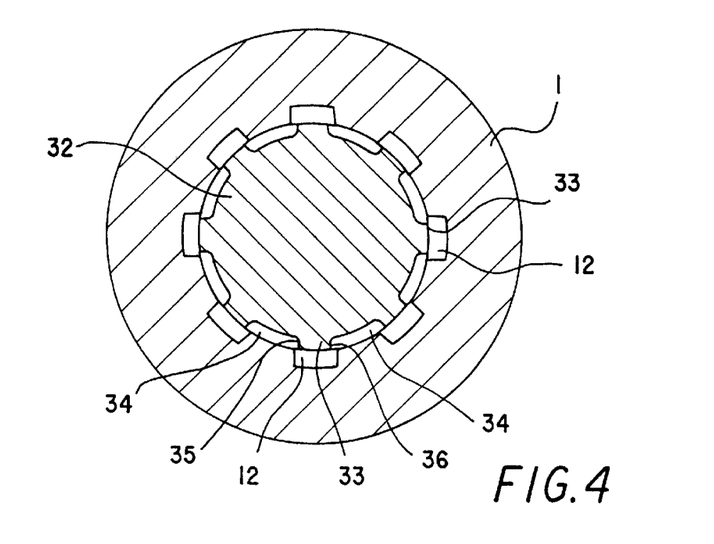
FIG. 4 is a cross sectional plan view through line III—III of FIG. 3 showing the mandrel and a slotted sleeve.
Figure 5A:
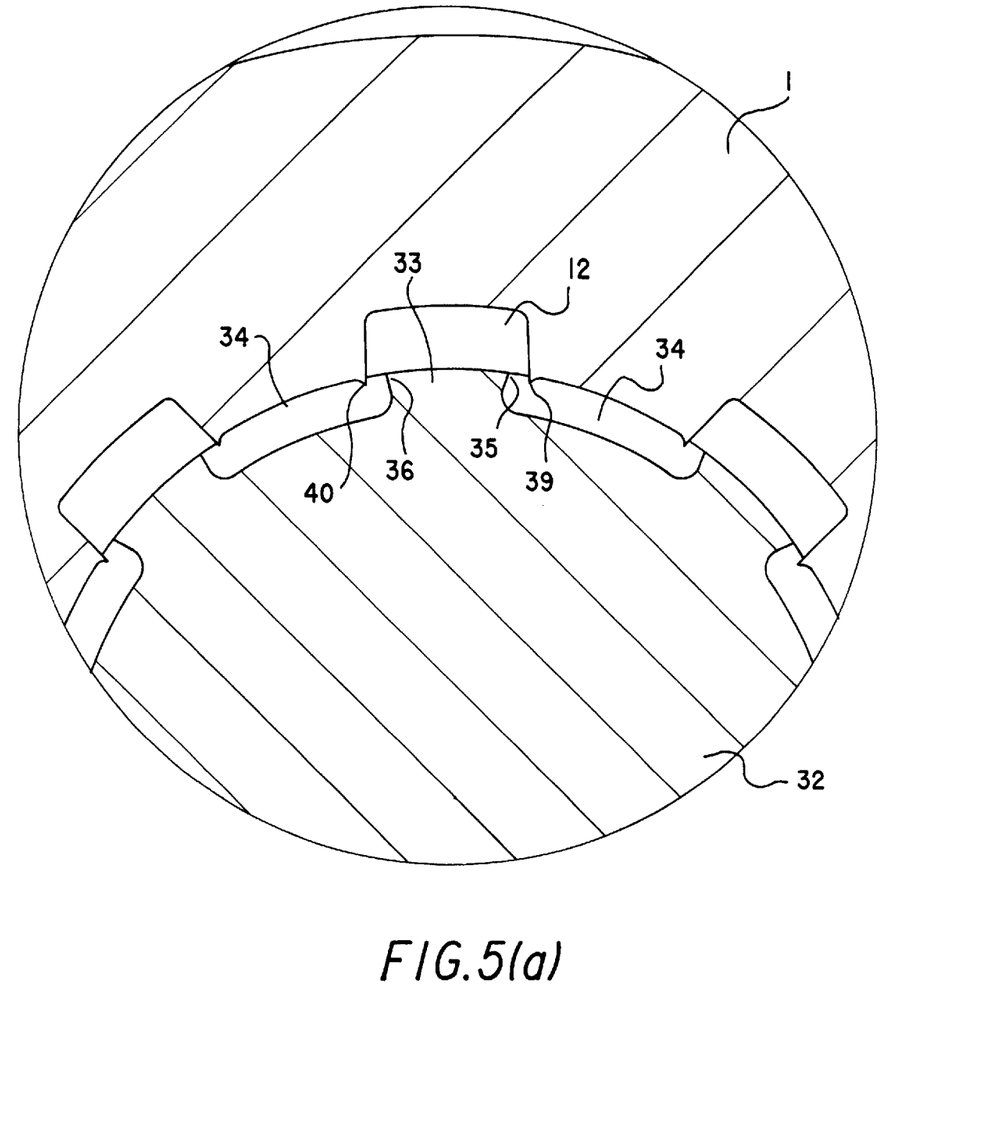
FIGS. 5(a), 5(b) and 5(c) are enlarged sectional views of a portion of the mandrel and sleeve shown in FIG. 4, shown at insertion of the mandrel, anticlockwise rotation of the mandrel, and clockwise rotation of the mandrel, respectively.

FIGS. 3 and 4 show mandrel 32 inserted into the bore of sleeve 1 after the slot cutting operation has taken place. Mandrel 32 has eight circumferentially arranged lands 33, whose number equals that of the respective eight slots 12 of sleeve 1. In other not shown embodiments, if the sleeve being machined has six slots, then a mandrel with six lands would be preferred, and so on. Lands 33 are separated by flutes (or grooves) 34. Each land 33 has two cutting edges 35, 36 each of which is disposed along the line of intersection with an adjoining flute 34. In this embodiment the cutting edges 35,36 of each respective land 33 are non-parallel, and are closer together at lower region 37 of mandrel than at the upper end 38, thereby forming a land 33 which is tapered in geometry FIG. 5(a) shows an enlarged view of a portion of mandrel 32 and sleeve 1, morel clearly depicting a number of lands 33 and respective slots 12 when mandrel 32 is inserted into the bore of the sleeve 1. Each land 33 is in underlap relationship with its respective slot 12 when mandrel 32 is inserted into the bore of sleeve 1. As a result of the cutting operation, burrs 39,40 have formed on, opposite sides of each slot 12, which extend radially into the bore of sleeve 1.

Figure 5B:
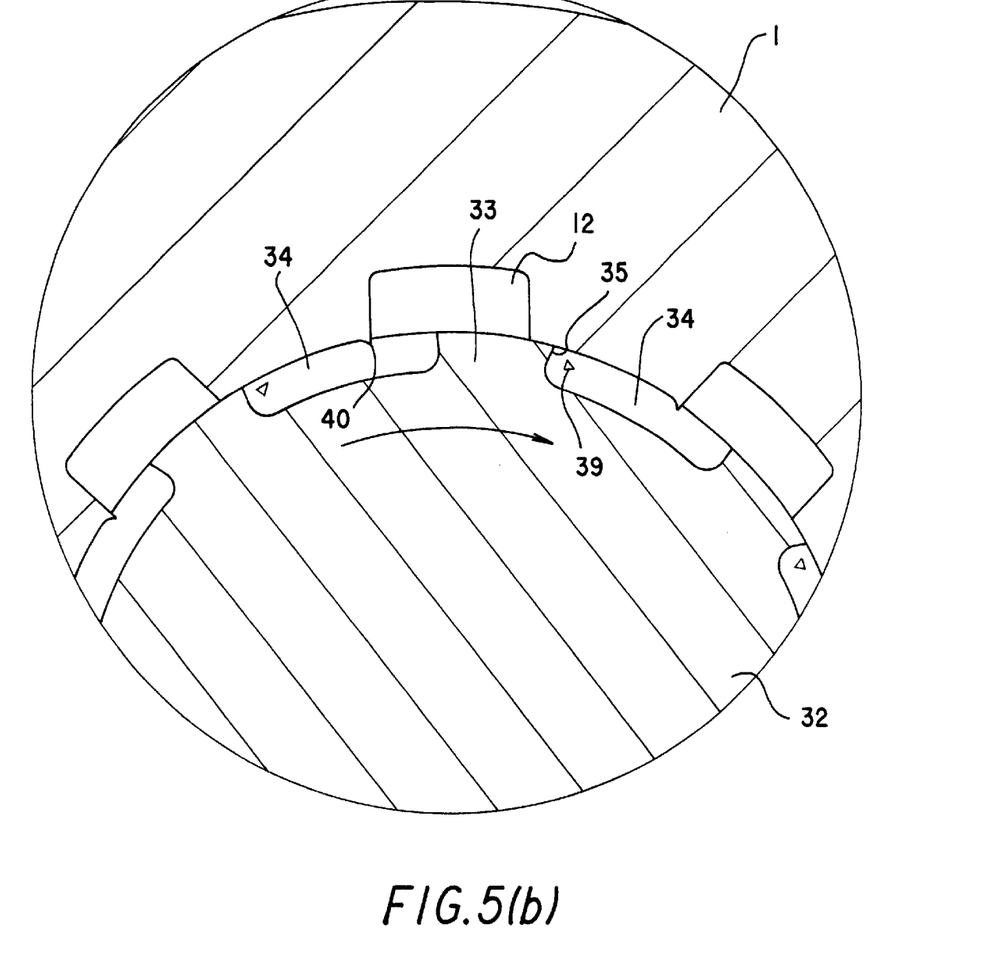
Figure 5C:
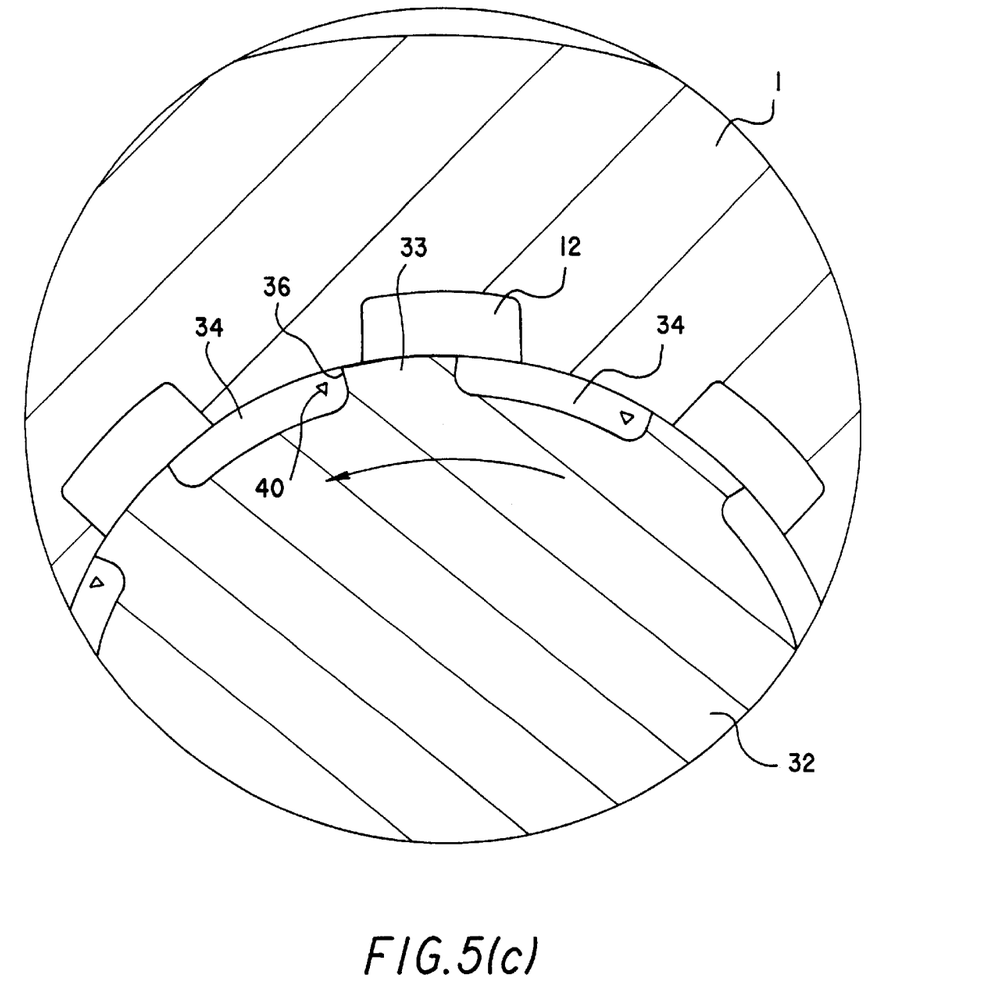

In order lo perform a de-burring operation on the slots, mandrel 32 is angularly rotated in a clockwise direction as shown in FIG. 5(b) thereby removing burrs 39 of each slot 12 by means of each cutting edge 35 passing a first side of a respective slot, and then angularly rotating mandrel 32 in an anticlockwise direction as shown in FIG. 5(c), such that burrs 40 are then removed in a similar manner on the opposite side of each respective slot. It should be noted that the sequence of rotation is not important ie an anticlockwise rotation of mandrel 32 may take place first to remove burrs 40, and then a clockwise rotation to remove burrs 39.

Figure 6:
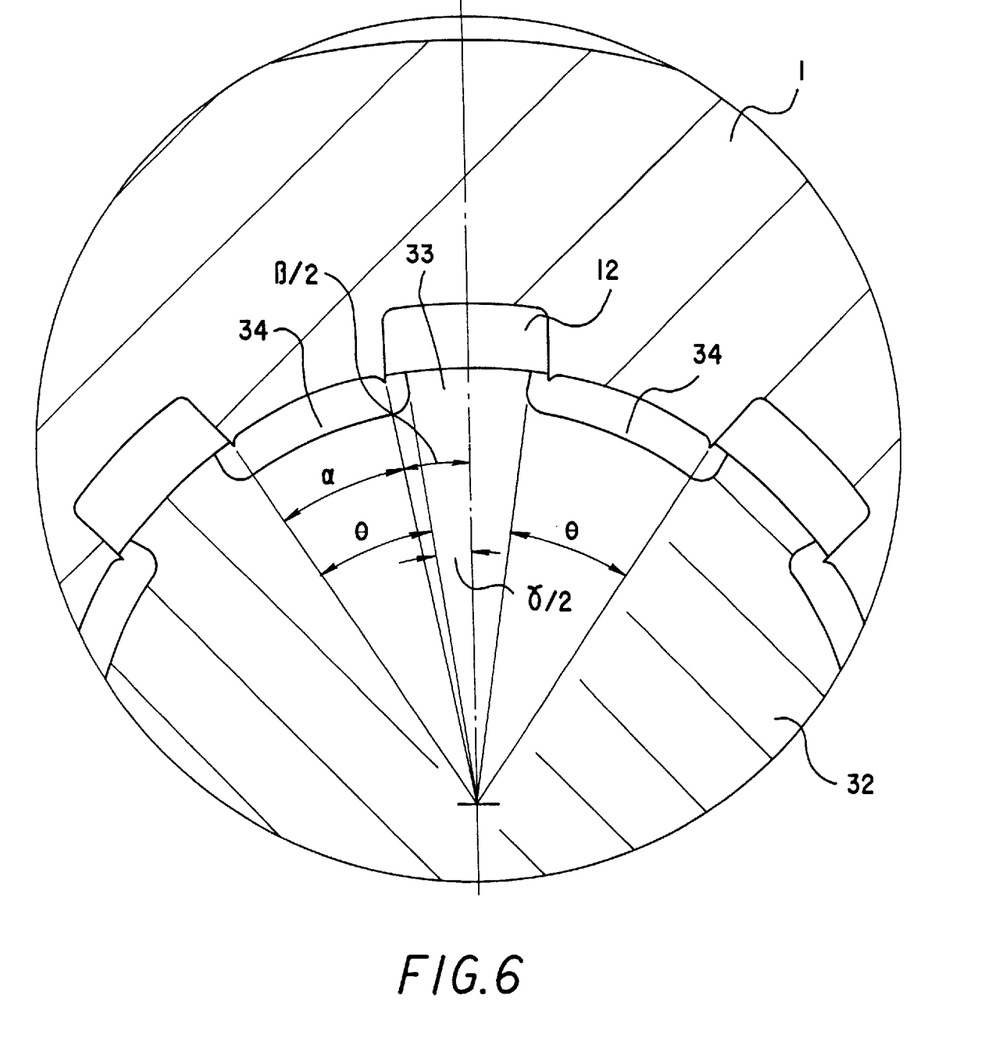
FIG. 6 is an identical view to FIG. 5(a) indicating a preferred relative angular rotation geometry.

Preferably the angular reciprocation takes place through a range of angles no more than 2θ as shown in FIG. 6, where;

$$\theta = \alpha + (\beta/2) - (\gamma/2); \text{ and}$$

α=subtended angle, at the centre of the sleeve, of one sleeve land (which separates two adjacent sleeve slots);

β=subtended angle, at the centre of the sleeve, of one sleeve slot;

γ=subtended angle, at the centre of the sleeve, of the appropriate land on the mandrel land, which underlaps the sleeve slot.

It should also be understood that whilst the above mentioned embodiment describes an arrangement where mandrel 32 is rotated and the sleeve is held stationary, the de-burring operation may be achieved by means of holding mandrel 32 stationary and rotating sleeve 1 by means of rotating work holding spindle 3, thereby imparting relative rotation therebetween.

Figure 7:
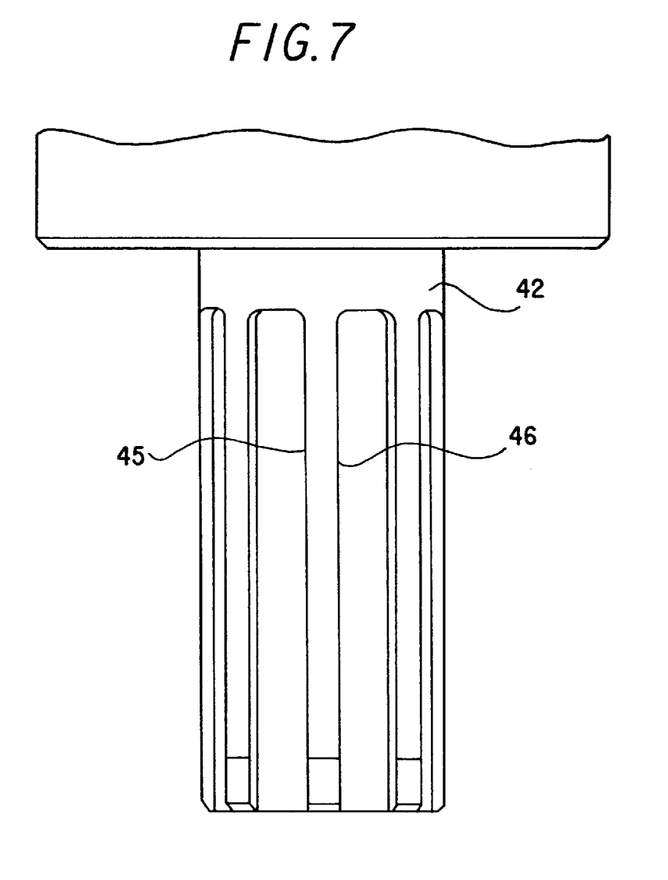
FIG. 7 is a elevational view of a second embodiment of a mandrel.
Figure 8:
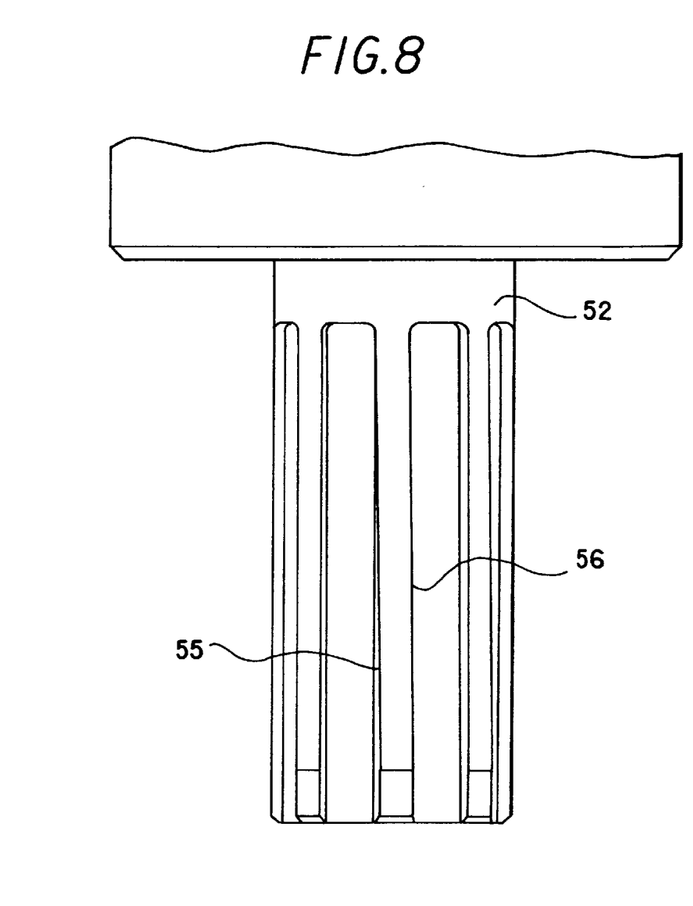
FIG. 8 is a elevational view of a third embodiment of a mandrel.

In other mandrel embodiments the cutting edge configuration may differ to that of mandrel 32. FIG. 7 depicts a mandrel 42 which has the cutting edges 45,46 substantially parallel with each other as well as that of the longitudinal axis of mandrel 42. FIG. 8 depicts a further embodiment in which mandrel 52 has cutting edges 55, 56 which are parallel to each other, but skewed to the axis of the substantially cylindrical mandrel 52, hence forming substantially helical cutting edges and lands.

In further not shown embodiments, particularly on larger bores the lands on a mandrel may be configured such that they are spring loaded outwardly forming an expanding mandrel which loads against the bore of sleeve 1 during reciprocation.

By performing a deburring operation as described above, it has been found that the resultant reduction in burring of the slot edges improves the "boost control" characteristics and reduces the "hiss" noise generated during operation of the assembled power steering valve.

It will be recognised by persons skilled in the art that numerous variations and modifications may be made to the invention without departing from the spirit and scope of the invention.

What is claimed is:

1. A method for machining a longitudinally extending slot in a bore of a component, the bore extending along and about a longitudinal axis, comprising the steps of gripping the component in a gripping means of a workholding device, performing a cutting operation in which the slot is cut in the bore by a cutting tool thereby forming burred slot edges, further machining the edges of the slot by inserting a deburring means into said bore and imparting relative angular reciprocation through a limited angle between said deburring means and the component.

2. A method for machining as claimed in claim 1, wherein said limited angle is less than 2θ, where:

$$\theta = \alpha + (\beta/2) - (\gamma/2)$$

α=an angle, at a center of a sleeve of a sleeve land separating two adjacent sleeve slots, β=an angle at the center of the sleeve of one sleeve slot, and γ=an angle at the center of the sleeve of the land on a mandrel.

3. A method for machining an angularly disposed array of parallel longitudinally extending slots in a bore of a component, the bore extending along and about a longitudinal axis, comprising the steps of gripping the component in a gripping means of a workholding device mounted on an indexable workholding spindle, performing a cutting operation in which the array of slots are cut in the bore by a cutting tool thereby forming burred slot edges, further machining the edges of each slot by inserting a deburring means into the bore of the component and imparting relative angular reciprocation between said deburring means and the component whilst the component remains gripped in said gripping means.

4. A method for machining as claimed in claim 3, wherein said relative angular reciprocation is through a limited angle.

5. A method for machining as claimed in claim 4, wherein said limited angle is less than 2θ, where:

$$\theta = \alpha + (\beta/2) - (\gamma/2)$$

α=an angle, at a center of a sleeve of a sleeve land separating two adjacent sleeve slots, β=an angle at the center of the sleeve of one sleeve slot, and γ=an angle at the center of the sleeve of the land on a mandrel.

6. An apparatus for machining an angularly disposed array of parallel longitudinally extending slots in a bore of a component, the bore extending along and about a longitudinal axis, the apparatus including gripping means for gripping the component in a workholding device mounted to an indexable workholding spindle, slotting means for cutting an array of slots within the bore thereby forming burred slot edges, the apparatus comprising: deburring means for machining the edges of each slot by inserting said deburring means into the bore and imparting a relative angular reciprocation between said deburring means and the component whilst the component remains gripped in the gripping means.

7. An apparatus as claimed in claim 6, wherein the component is a sleeve and the slot is a sleeve slot.

8. An apparatus as claimed in claim 6, wherein the deburring means is a mandrel extending along and about the longitudinal axis which is rotationally guided by the bore of the component during said relative angular reciprocation, the mandrel incorporating at least two cutting edges, said at least two cutting edges comprising a first cutting edge arranged to deburr a first edge of at least one of the slots during clockwise relative rotation of the mandrel, and a second cutting edge to deburr a second edge of the at least one slot during anticlockwise relative angular rotation of the mandrel.

9. An apparatus as claimed in claim 8 wherein the mandrel is substantially cylindrical and has on an outside surface with a land lying circumferentially between two flutes, said first and second cutting edges disposed along intersecting lines of the land and the two flutes, the land arranged to radially align with and be circumferentially between the sleeve slot immediately prior to said relative angular reciprocation.

10. An apparatus as claimed in claim 9 wherein the first and second cutting edges are substantially parallel to each other and arranged parallel to the longitudinal axis of the substantially cylindrical mandrel.

11. An apparatus as claimed in claim 9 wherein the first and second cutting edges are substantially parallel to each other and arranged skew to the longitudinal axis of the substantially cylindrical mandrel, hence forming a substantially helical land.

12. An apparatus as claimed in claim 9 wherein the first and second cutting edges are non-parallel relative to each other, hence forming a tapered land.

13. A deburring tool for deburring first and second edges of a longitudinally extending slot disposed in a bore of a component, the bore extending along and about a longitudinal axis, said tool adapted to be rotationally guided by said bore, said tool comprising a generally cylindrically-shaped mandrel extending along and about the longitudinal axis, said mandrel incorporating at least two cutting edges extending generally along at least a portion of a length thereof, said at least two cutting edges comprising a first cutting edge arranged to deburr the first edge of the slot during a clockwise relative angular rotation of the mandrel, and a second cutting edge arranged to deburr the second edge of the slot during an anticlockwise relative angular rotation of the mandrel.

14. A deburring tool as claimed in claim 13 wherein the mandrel is substantially cylindrical and has an outside surface with a land lying circumferentially between two flutes, said first and second cutting edges disposed along intersecting lines of the land and the two flutes.

15. A deburring tool as claimed in claim 14 wherein said first and second cutting edges are substantially parallel to each other and arranged parallel to the longitudinal axis of the substantially cylindrical mandrel.

16. A deburring tool as claimed in claim 14 wherein said first and second cutting edges are substantially parallel to each other and arranged skew to the longitudinal axis of the substantially cylindrical mandrel, thereby forming a substantially helical land during use.

17. A deburring tool as claimed in claim 14 wherein the first and second cutting edges are non-parallel relative to each other, thereby forming a tapered land during use.

* * * * *